US011518300B2

(12) United States Patent
Kasuga et al.

(10) Patent No.: US 11,518,300 B2
(45) Date of Patent: Dec. 6, 2022

(54) PRESENTATION DEVICE

(71) Applicant: MITSUBISHI ELECTRIC CORPORATION, Tokyo (JP)

(72) Inventors: Kei Kasuga, Tokyo (JP); Tsutomu Matsubara, Tokyo (JP); Reiko Sakata, Tokyo (JP); Shinsaku Fukutaka, Tokyo (JP); Takaaki Kase, Tokyo (JP); Hiroshi Yano, Tokyo (JP); Ryutaro Morisono, Tokyo (JP); Naoyuki Watanabe, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 13 days.

(21) Appl. No.: 16/613,004

(22) PCT Filed: Oct. 12, 2017

(86) PCT No.: PCT/JP2017/036977
§ 371 (c)(1),
(2) Date: Nov. 12, 2019

(87) PCT Pub. No.: WO2018/225281
PCT Pub. Date: Dec. 13, 2018

(65) Prior Publication Data
US 2020/0164794 A1 May 28, 2020

(30) Foreign Application Priority Data

Jun. 6, 2017 (JP) .............................. JP2017-111276

(51) Int. Cl.
*B60Q 1/26* (2006.01)
*H01K 7/00* (2006.01)
(Continued)

(52) U.S. Cl.
CPC ................ *B60Q 1/525* (2013.01); *B60Q 1/24* (2013.01); *H05B 47/10* (2020.01); *G05D 1/0088* (2013.01)

(58) Field of Classification Search
CPC combination set(s) only.
See application file for complete search history.

(56) References Cited

U.S. PATENT DOCUMENTS 5,529,138 A * 6/1996 Shaw .................. B60R 16/0231
180/169
6,023,220 A * 2/2000 Dobler ...................... B60Q 1/52
340/440

(Continued)

FOREIGN PATENT DOCUMENTS

DE 10 2015 115 242 A1 3/2017
EP 1 916 154 A1 4/2008
(Continued)

OTHER PUBLICATIONS

Japanese Office Action, dated Jul. 21, 2020, for Japanese Application No. 2017-111276, with an English machine translation.

(Continued)

*Primary Examiner* — Minh D A
(74) *Attorney, Agent, or Firm* — Birch, Stewart, Kolasch & Birch, LLP

(57) ABSTRACT

There are included a vehicle behavior estimating unit (10) that estimates behavior of a vehicle (1); pattern illuminating units (4a to 4d) that illuminate a projection pattern onto ground around the vehicle (1); and an illumination control unit (11). The illumination control unit (11) controls the pattern illuminating units (4a to 4d) to illuminate a projection pattern, on the basis of the behavior of the vehicle (1) estimated by the vehicle behavior estimating unit (10).

7 Claims, 11 Drawing Sheets

(51) Int. Cl.
    *B60Q 1/50*     (2006.01)
    *H05B 47/10*     (2020.01)
    *B60Q 1/24*     (2006.01)
    *G05D 1/00*     (2006.01)

(56) References Cited

U.S. PATENT DOCUMENTS

| | | | |
|---|---|---|---|
| 2003/0147247 A1* | 8/2003 | Koike | B60Q 1/50 362/464 |
| 2008/0175012 A1* | 7/2008 | Shimaoka | B60Q 9/008 |
| 2010/0253594 A1* | 10/2010 | Szczerba | G08G 1/165 345/7 |
| 2016/0059771 A1* | 3/2016 | Meinzer | B60Q 1/323 362/464 |
| 2016/0090025 A1* | 3/2016 | Nagasawa | B60Q 1/143 362/466 |
| 2016/0257243 A1* | 9/2016 | Son | B06Q 1/50 |
| 2016/0259034 A1* | 9/2016 | Imagawa | G01S 17/46 |
| 2017/0021768 A1* | 1/2017 | Jaegal | H04R 1/323 |
| 2017/0101147 A1 | 4/2017 | Hasegawa | |
| 2017/0151906 A1* | 6/2017 | Sakuma | B62D 15/025 |
| 2017/0203685 A1* | 7/2017 | Hirai | B60Q 1/50 |
| 2017/0259731 A1* | 9/2017 | Son | F21S 43/31 |
| 2017/0259734 A1 | 9/2017 | Imaishi et al. | |
| 2017/0267167 A1* | 9/2017 | Sakata | B60Q 1/38 |
| 2018/0004020 A1 | 1/2018 | Kunii et al. | |
| 2018/0029641 A1* | 2/2018 | Solar | G06T 7/90 |
| 2018/0319320 A1 | 11/2018 | Tatara et al. | |

FOREIGN PATENT DOCUMENTS

| | | |
|---|---|---|
| JP | 59-206533 A | 11/1984 |
| JP | 4-316415 A | 11/1992 |
| JP | 9-160639 A | 6/1997 |
| JP | 2002-79896 A | 3/2002 |
| JP | 2003-285685 A | 10/2003 |
| JP | 2004-118469 A | 4/2004 |
| JP | 2007-295033 A | 11/2007 |
| JP | 2010-18165 A | 1/2010 |
| JP | 2013-147083 A | 8/2013 |
| JP | 2017-74820 A | 4/2017 |
| JP | 6214775 B2 | 10/2017 |
| JP | 6300938 B2 | 3/2018 |
| WO | WO 2016/027312 A1 | 2/2016 |
| WO | WO 2016/027314 A1 | 2/2016 |
| WO | WO 2016/114048 A1 | 7/2016 |
| WO | WO 2017/073635 A1 | 5/2017 |

OTHER PUBLICATIONS

International Search Report, issued in PCT/JP2017/036977, PCT/ISA/210, dated Jan. 9, 2018.
Indian Office Action dated Mar. 31, 2021 in corresponding Indian Patent Application No. 2019 4704 9138.
German Office Action issued in corresponding German Patent Application No. 11 2017 007 499.1 dated Jul. 31, 2020.
Chinese Office Action dated Aug. 1, 2022 issued in corresponding Chinese Patent Application No. 201780091340.1 with an English Translation.

\* cited by examiner

PRESENTATION DEVICE

TECHNICAL FIELD

The invention relates to a presentation device that illuminates a projection pattern in accordance with behavior of a vehicle.

BACKGROUND ART

Conventionally, there is known a technique for notifying a pedestrian of an approach of a vehicle by outputting a pseudo traveling sound or a warning sound to the outside of the vehicle. Note, however, that outputting a pseudo traveling sound or a warning sound breaks quietness of the outside of the vehicle, and thus, the sound becomes noise to other people than the warning target pedestrian.

On the other hand, there is also proposed a technique for presenting behavior of a mobile unit without using a pseudo traveling sound or a warning sound. For example, an autonomous mobile device described in Patent Literature 1 includes a monitor that displays a current point of gaze forward in a proceeding direction. A person located in a moving path of the autonomous mobile device can recognize the moving direction of the autonomous mobile device, on the basis of the point of gaze displayed on the display means.

CITATION LIST

Patent Literatures

Patent Literature 1: JP 2004-118469 A

SUMMARY OF INVENTION

Technical Problem

Conventional art as represented by Patent Literature 1 has a problem that behavior of a vehicle cannot be grasped unless a person located around the vehicle pays attention to display means of the vehicle.

By using a warning sound, behavior of the vehicle can be grasped even if a person around the vehicle does not pay attention to the vehicle. However, as described above, the warning sound becomes noise to other people than the waring target person.

The present invention is devised to solve the above-described problem, and an object of the invention is to obtain a presentation device that allows a person to grasp behavior of a vehicle, without generating noise, even if the person does not pay attention to the vehicle.

Solution to Problem

A presentation device according to the invention includes: an estimating unit estimating behavior of a vehicle; an illuminating unit illuminating a projection pattern onto ground around the vehicle; and a control unit controlling the illuminating unit to illuminate the projection pattern in accordance with the behavior of the vehicle estimated by the estimating unit.

Advantageous Effects of Invention

According to the invention, since a projection pattern corresponding to behavior of the vehicle is illuminated onto the ground around the vehicle, the behavior of the vehicle can be grasped, without generating noise, by a person who does not pay attention to the vehicle.

DESCRIPTION OF EMBODIMENTS

To describe the present invention in more detail, some embodiments for carrying out the invention will be described below with reference to the accompanying drawings.

First Embodiment

Figure 1:
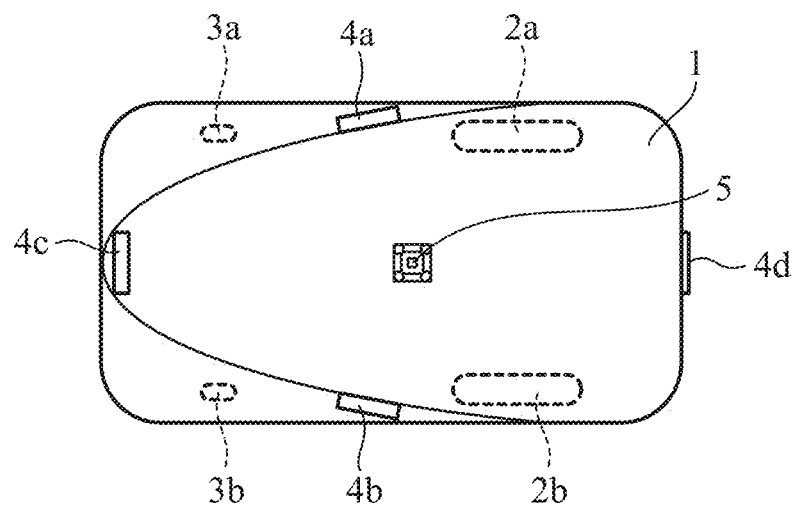
FIG. 1 is a plan view of a main part showing a vehicle control system including a presentation device according to a first embodiment of the invention.
Figure 2:
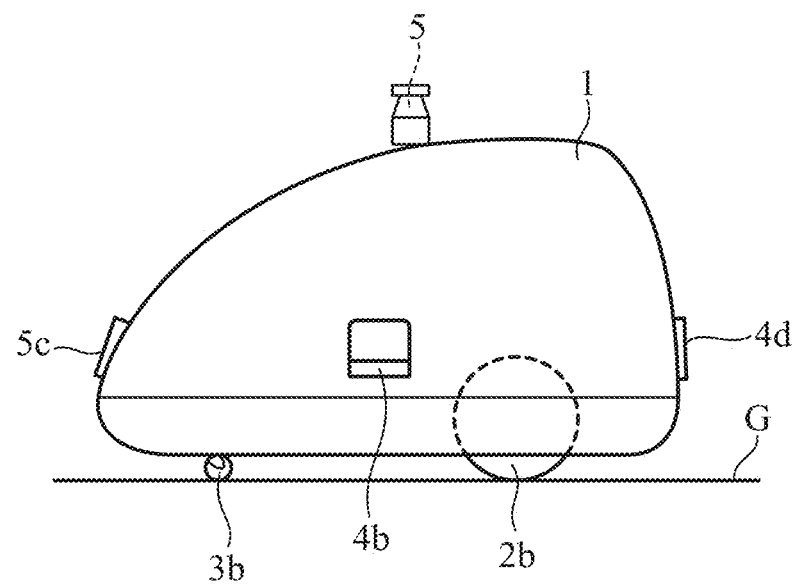
FIG. 2 is a side view of the main part showing the vehicle control system including the presentation device according to the first embodiment.

FIG. 1 is a plan view of a main part showing a vehicle control system including a presentation device according to a first embodiment of the invention. In addition, FIG. 2 is a side view of the main part showing the vehicle control system including the presentation device according to the first embodiment. A vehicle 1 travels autonomously toward a point set in advance, and includes driving wheels 2a and 2b and driven wheels 3a and 3b. The driving wheels 2a and 2b are driven to rotate by driving power generated by a motor (not shown) and transmitted to the driving wheels 2a and 2b. By controlling the drive of the driving wheel 2a and the driving wheel 2b independently of each other, the vehicle 1 travels in any direction. The driven wheels 3a and 3b are supported on the bottom of the vehicle 1 to be turnable about an axis in a vertical direction and so as not to hinder the turning operation of the driving wheels 2a and 2b.

Pattern illuminating units 4a to 4d each illuminate a projection pattern onto ground G. For example, the pattern illuminating units 4a to 4d are each formed using projection lamps or lasers. The projection pattern is a pattern of visible light illuminated onto the ground around the vehicle 1, and is implemented by, for example, a graphic pattern of any shape, a pattern of characters, or a pattern of a combination of a graphic pattern and a pattern of characters.

In FIGS. 1 and 2, the pattern illuminating unit 4a illuminates a projection pattern onto the ground G on the right side of the vehicle 1, and the pattern illuminating unit 4b illuminates a projection pattern onto the ground G on the left side of the vehicle 1. Further, the pattern illuminating unit 4c illuminates a projection pattern onto the ground G ahead of the vehicle 1, and the pattern illuminating unit 4d illuminates a projection pattern onto the ground G behind the vehicle 1. An external sensor 5 detects conditions around the vehicle 1, and is, for example, a camera that detects three-dimensional shapes around the vehicle 1 or captures images of an area around the vehicle 1. By the external sensor 5, obstacles ahead of the traveling vehicle 1 are detected.

Figure 3:
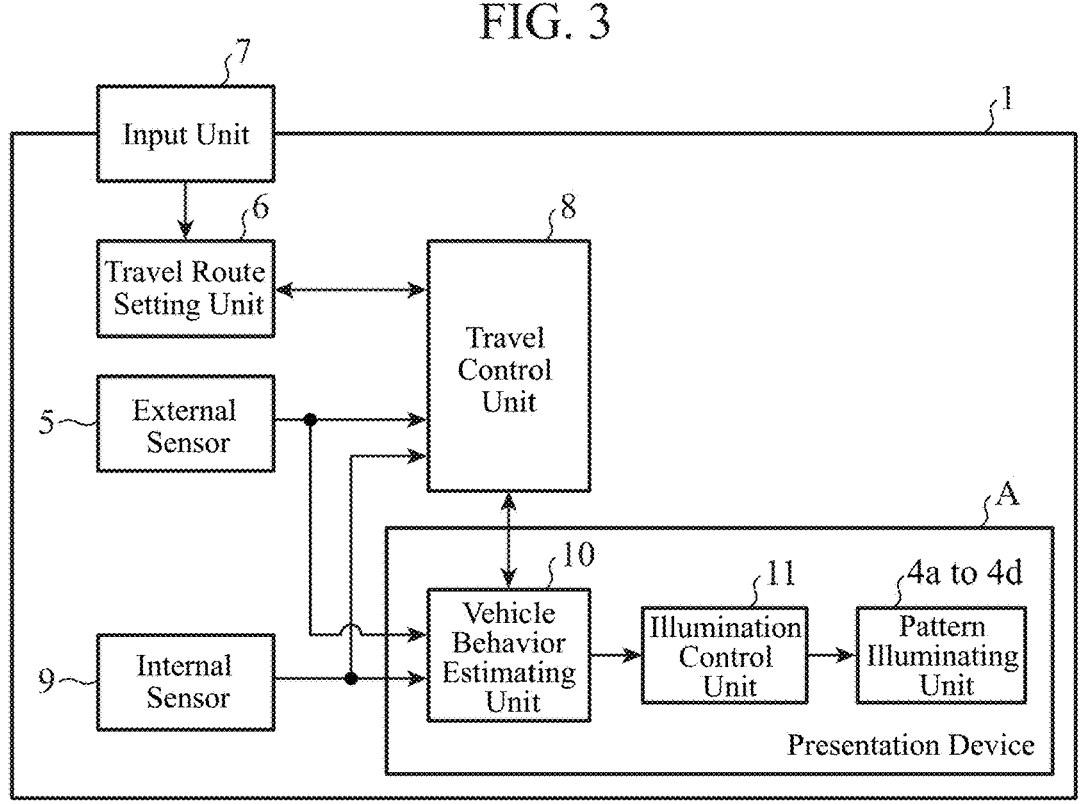
FIG. 3 is a block diagram showing a configuration of the vehicle control system including the presentation device according to the first embodiment.

FIG. 3 is a block diagram showing a configuration of the vehicle control system including a presentation device A according to the first embodiment. In FIG. 3, the same components as those of FIGS. 1 and 2 are denoted by the same reference signs and description thereof is omitted. The vehicle control system shown in FIG. 3 includes the external sensor 5, a travel route setting unit 6, an input unit 7, a travel control unit 8, an internal sensor 9, and the presentation device A.

The travel route setting unit 6 sets a route on which the vehicle 1 is controlled to travel thereon. For example, the travel route setting unit 6 calculates a route to a destination point through a transit point with avoiding obstacles, on the basis of the transit point, the destination point, the locations of known obstacles, and map information which are received by the input unit 7. The travel control unit 8 controls the rotating drive of the driving wheels 2a and 2b in such a manner that the vehicle 1 travels along the route set by the travel route setting unit 6. The internal sensor 9 detects behavior of the vehicle 1, and detects, for example, the travel speed, acceleration, angular velocity, and angle of inclination of the vehicle 1.

The presentation device A includes the pattern illuminating units 4a to 4d, a vehicle behavior estimating unit 10, and an illumination control unit 11. The vehicle behavior estimating unit 10 estimates behavior of the vehicle 1 on the basis of at least one of control information for the vehicle 1 used by the travel control unit 8, detected information obtained by the external sensor 5, and detected information obtained by the internal sensor 9. The behavior of the vehicle 1 includes, for example, a collision of the vehicle 1 with an obstacle, inclination of the vehicle 1, and the rollover, slide-down, skid, and slip of the vehicle 1 associated with acceleration or deceleration. The illumination control unit 11 controls the pattern illuminating units 4a to 4d to illuminate a projection pattern on a basis of the behavior estimated by the vehicle behavior estimating unit 10.

Figure 4A:
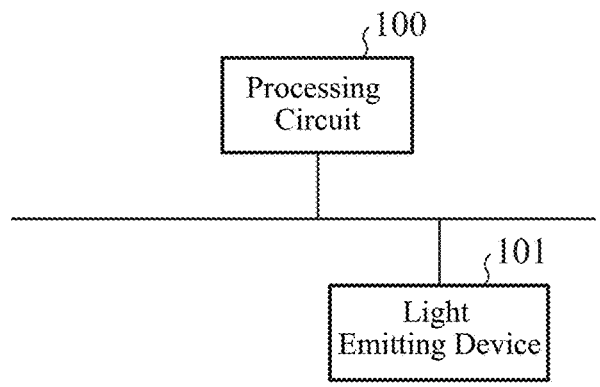
FIG. 4A is a block diagram showing a hardware configuration that implements functions of the presentation device according to the first embodiment.
Figure 4B:
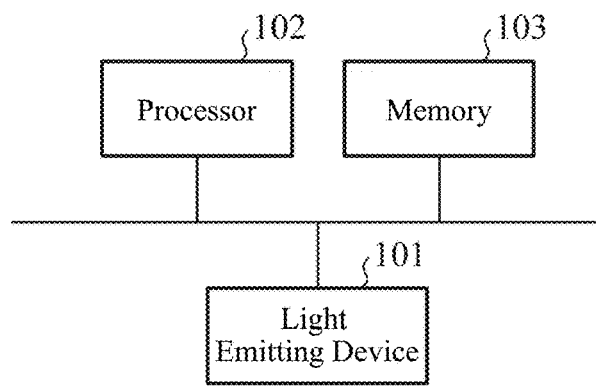
FIG. 4B is a block diagram showing a hardware configuration that executes software that implements the functions of the presentation device according to the first embodiment.

FIG. 4A is a block diagram showing a hardware configuration that implements the functions of the presentation device A. In FIG. 4A, a processing circuit 100 is connected to a light emitting device 101. FIG. 4B is a block diagram showing a hardware configuration that executes software that implements the functions of the presentation device A.

In FIG. 4B, a processor 102 and a memory 103 are connected to the light emitting device 101. The pattern illuminating units 4a to 4d of the presentation device A are the light emitting device 101, and are, for example, projection lamps or lasers.

Each function of the vehicle behavior estimating unit 10 and the illumination control unit 11 of the presentation device A is implemented by a processing circuit. Namely, the presentation device A includes a processing circuit for performing processes at step ST1 to ST8 shown in FIG. 5. The processing circuit may be dedicated hardware or may be a Central Processing Unit (CPU) that executes programs stored in a memory.

When the processing circuit is dedicated hardware shown in FIG. 4A, the processing circuit 100 corresponds, for example, to a single circuit, a combined circuit, a programmed processor, a parallel programmed processor, an Application Specific Integrated Circuit (ASIC), a Field-Programmable Gate Array (FPGA), or a combination thereof.

The functions of the vehicle behavior estimating unit 10 and the illumination control unit 11 may be implemented by different processing circuits, or the functions may be collectively implemented by a single processing circuit.

When the processing circuit is the processor 102 shown in FIG. 4B, each function of the vehicle behavior estimating unit 10 and the illumination control unit 11 is implemented by software, firmware, or a combination of software and firmware. The software or firmware is described as a program and stored in the memory 103.

The processor 102 implements the functions of the respective units by reading and executing the programs stored in the memory 103. Namely, the presentation device A includes the memory 103 for storing programs that cause the processes at step ST1 to ST8 shown in FIG. 5 to be consequently performed when executed by the processor 102. The programs cause a computer to perform procedures or methods for the vehicle behavior estimating unit 10 and the illumination control unit 11.

The memory 103 corresponds, for example, to a nonvolatile or volatile semiconductor memory such as a Random Access Memory (RAM), a Read Only Memory (ROM), a flash memory, an Erasable Programmable Read Only Memory (EPROM), or an Electrically-EPROM (EEPROM), a magnetic disk, a flexible disk, an optical disc, a compact disc, a MiniDisc, or a DVD.

One of the functions of the vehicle behavior estimating unit 10 and the illumination control unit 11 may be implemented by dedicated hardware, and the other may be implemented by software or firmware.

For example, the processing circuit 100 serving as dedicated hardware may implement the function of the vehicle behavior estimating unit 10, and the processor 102 may implement the function of the illumination control unit 11 by reading and executing a program stored in the memory 103.

As such, the processing circuit can implement each of the above-described functions by hardware, software, firmware, or a combination thereof.

Next, an operation of this embodiment will be described.

Figure 5:
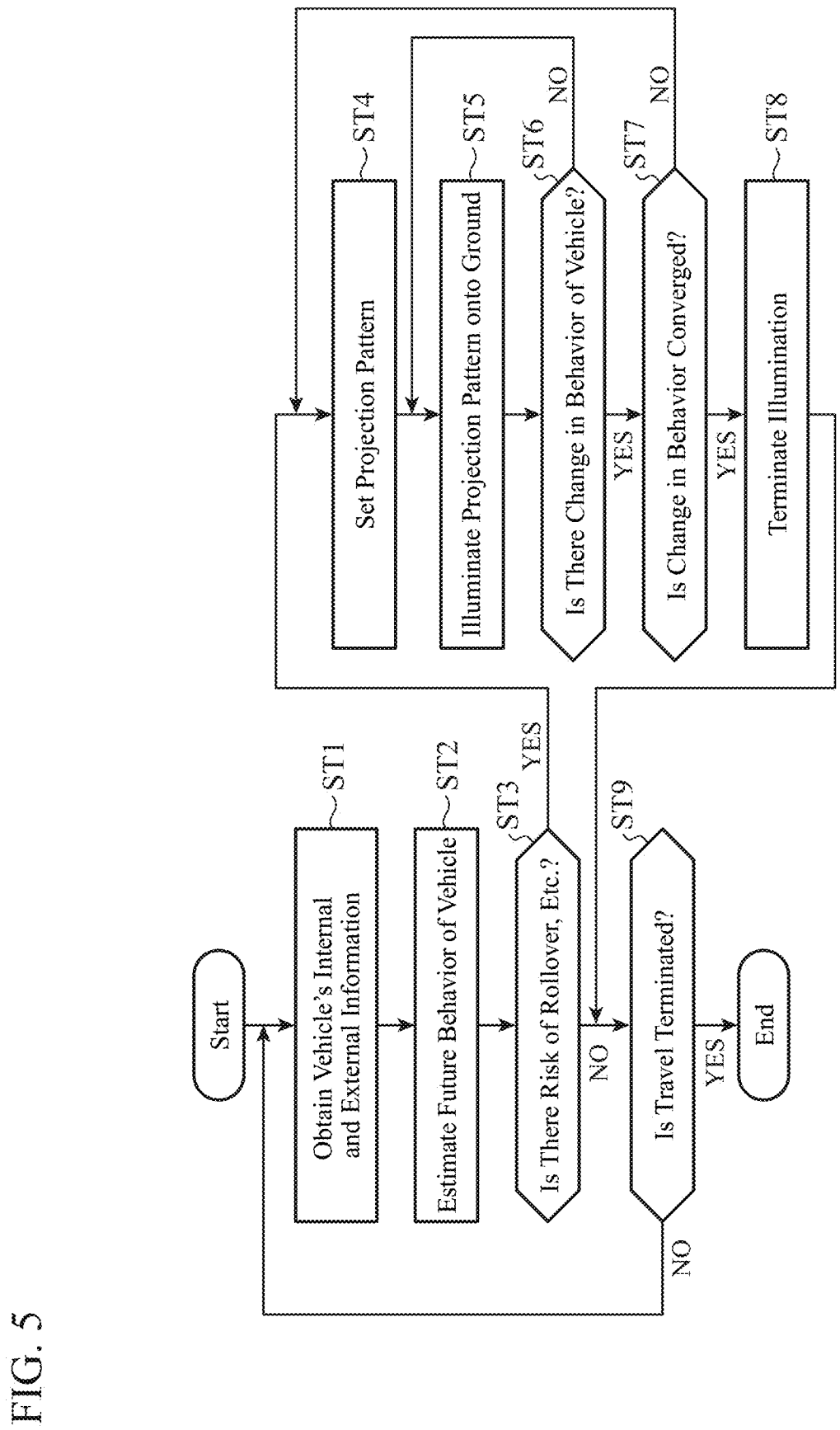
FIG. 5 is a flowchart showing an operation of the presentation device according to the first embodiment.

FIG. 5 is a flowchart showing the operation of the presentation device A, and shows a specific example of a process of illuminating a projection pattern. Note that, it is assumed that, before the operation shown in FIG. 5, the input unit 7 accepted information required to calculate a travel route, the travel route setting unit 6 calculated a travel route on the basis of the information accepted by the input unit 7, and the travel control unit 8 caused the vehicle 1 to travel in accordance with the travel route.

First, the vehicle behavior estimating unit 10 obtains vehicle's internal and external information detected by the external sensor 5 and the internal sensor 9 (step ST1). The vehicle's internal and external information are also outputted to the travel control unit 8 from the external sensor 5 and the internal sensor 9. The travel control unit 8 controls the travel of the vehicle 1 on the basis of the vehicle's internal and external information to avoid collisions of the vehicle 1 with obstacles, inclination of the vehicle 1, the rollover, slide-down, skid, and slip of the vehicle 1 associated with acceleration or deceleration, etc.

The vehicle behavior estimating unit 10 estimates behavior of the vehicle 1 to be exhibited from a current time to any certain point in time after the current time (hereinafter, such an estimated behavior is referred to as future behavior of the vehicle 1), on the basis of the vehicle's internal and external information (step ST2).

For example, the vehicle behavior estimating unit 10 estimates behavior of the vehicle 1 controlled by the travel control unit 8, such as acceleration, deceleration, or a turn, as future behavior of the vehicle 1.

Then, the illumination control unit 11 determines whether the future behavior of the vehicle 1 estimated by the vehicle behavior estimating unit 10 is abnormal behavior such as rollover of the vehicle 1 (step ST3). As abnormal behavior, in addition to rollover of the vehicle 1, a slide-down on a slope or a skid of the vehicle 1, and a slip of the driving wheels 2*a* and 2*b* can be considered. Note that abnormal behavior of the vehicle 1 is not limited to the above examples, and may be any behavior as long as the behavior has potential to affect an area around the vehicle 1.

If the future behavior of the vehicle 1 is abnormal (step ST3; YES), the illumination control unit 11 sets a projection pattern in accordance with the future behavior of the vehicle 1, on the pattern illuminating units 4*a* to 4*d* (step ST4). For example, the illumination control unit 11 selects a projection pattern in accordance with the future behavior of the vehicle 1 estimated by the vehicle behavior estimating unit 10 from table data in which details of behavior are associated with projection patterns, and sets the selected projection pattern on the pattern illuminating units 4*a* to 4*d*. In the table data, information is set that indicates that a first projection pattern corresponds rollover and a second projection pattern corresponds inclination, and such table data is stored in a memory (not shown) included in the presentation device A.

The pattern illuminating units 4*a* to 4*d* illuminate the projection pattern set by the illumination control unit 11 onto the ground G (step ST5). A person around the vehicle 1 can grasp the future behavior of the vehicle 1 from the projection pattern illuminated onto the ground G, without paying attention to the vehicle 1.

Thereafter, the vehicle behavior estimating unit 10 checks whether there is a change in the future behavior of the vehicle 1, by sequentially obtaining vehicle's internal and external information from the external sensor 5 and the internal sensor 9 and estimating future behavior of the vehicle 1 every time the vehicle's internal and external information are obtained (step ST6).

If there is no change in the future behavior of the vehicle 1 (step ST6; NO), processing returns to the process at step ST5, and the illumination of the projection pattern by the pattern illuminating units 4*a* to 4*d* continues.

On the other hand, if there is a change in the future behavior of the vehicle 1 (step ST6; YES), the illumination control unit 11 determines whether the change in the future behavior of the vehicle 1 has settled (step ST7).

For example, when the future behavior estimated at step ST2 gets worse, the illumination control unit 11 determines that the change in the future behavior of the vehicle 1 does not settle. In addition, when the future behavior estimated at step ST2 has eased, the illumination control unit 11 determines that the change in the future behavior of the vehicle 1 has settled.

If it is determined that the change in the future behavior of the vehicle 1 does not settle (step ST7; NO), the illumination control unit 11 returns to the process at step ST4, and sets a projection pattern on the pattern illuminating units 4*a* to 4*d* in accordance with the future behavior of the vehicle 1 estimated at step ST6.

If it is determined that the change in the future behavior of the vehicle 1 has settled (step ST7; YES), the illumination control unit 11 controls the pattern illuminating units 4*a* to 4*d* to terminate the illumination of the projection pattern. By this control, the pattern illuminating units 4*a* to 4*d* terminate the illumination of the projection pattern (step ST8). Note that when the change in the future behavior of the vehicle 1 has settled, the illumination control unit 11 may allow the pattern illuminating units 4*a* to 4*d* to continue the illumination of the projection pattern having been illuminated so far, for a preset period of time without changing the projection pattern.

On the other hand, if the future behavior of the vehicle 1 is not abnormal (step ST3; NO) or if the process at step ST8 is completed, the vehicle behavior estimating unit 10 determines whether the travel of the vehicle 1 is to be terminated, on the basis of vehicle's internal and external information (step ST9). For example, when the vehicle behavior estimating unit 10 estimates that the travel control of the vehicle 1 is to be terminated on the basis of control information for the vehicle 1 inputted from the travel control unit 8, the vehicle behavior estimating unit 10 determines that the travel of the vehicle 1 is to be terminated.

If it is determined by the vehicle behavior estimating unit 10 that the travel of the vehicle 1 is to be terminated (step ST9; YES), the process of FIG. 5 ends.

If it is not determined by the vehicle behavior estimating unit 10 that the travel of the vehicle 1 is terminated (step ST9; NO), a series of processes from step ST1 are repeated.

Next a specific example of illumination of a projection pattern will be described.

Figure 6:
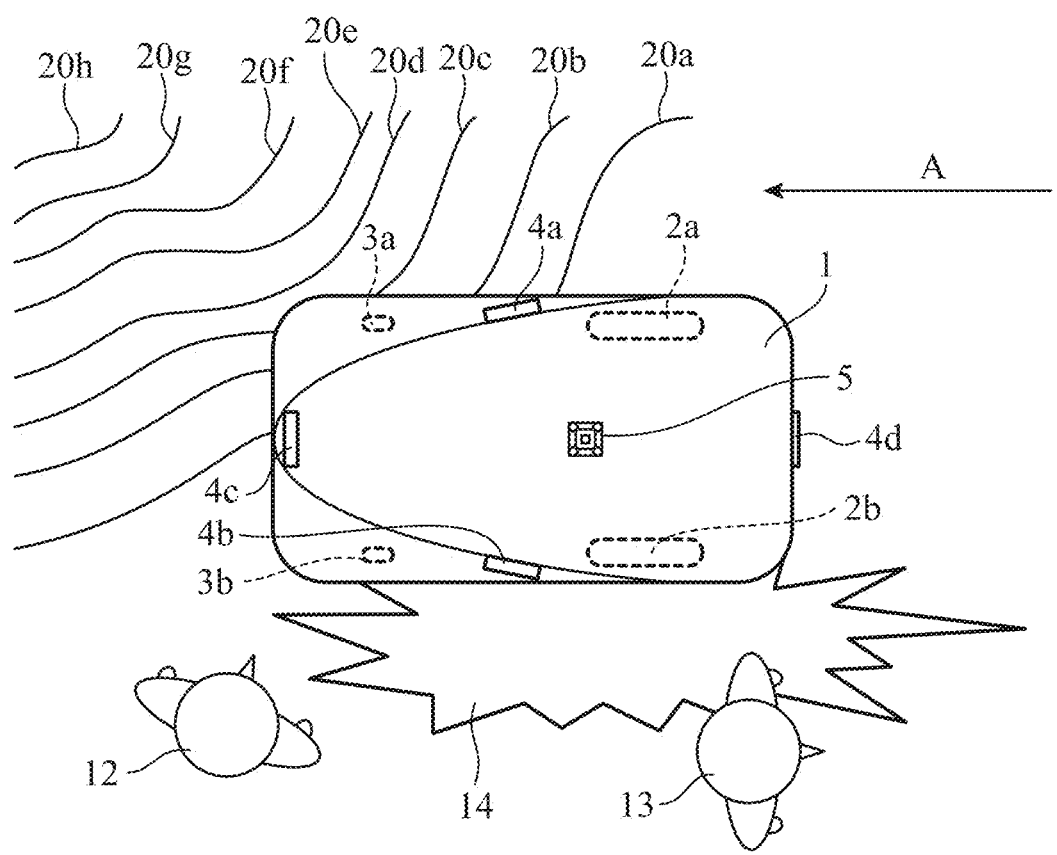
FIG. 6 is a diagram showing exemplary illumination of a projection pattern of the first embodiment.

FIG. 6 is a diagram showing exemplary illumination of a projection pattern. In FIG. 6, there are a person 12 and a person 13 around the vehicle 1, and the person 12 faces in a direction in which he/she can view the vehicle 1, but the person 13 faces in a direction in which the vehicle 1 is out of his/her sight.

The pattern illuminating units 4*b* and 4*d* illuminates a projection pattern 14 onto the ground on the left side of the vehicle 1 and the ground behind the vehicle 1. Contour lines 20*a* to 20*h* indicates the elevation of the ground, and the position of the contour line 20*a* is the lowest and the position of the contour line 20*h* is the highest, and the ground gets higher as it gets closer to the contour line 20*h* from the contour line 20*a*.

When the vehicle 1 proceeds in a direction of arrow A, since the vehicle 1 rides on a slope region of the ground from a driven wheel 3*a* side, the vehicle 1 inclines in such a manner that its right side is raised and its left side is lowered. This inclination is detected by the internal sensor 9 provided in the vehicle 1. Here, a case in which the vehicle 1 further proceeds in the direction of arrow A and the inclination of the vehicle 1 has increased, a case in which the vehicle 1 is steered to make a right turn by controlling the rotating drive of the driving wheels 2a and 2b, or a case in which the proceeding speed of the vehicle 1 has increased in these states is considered. In any of these cases, the vehicle behavior estimating unit 10 estimates "rollover of the vehicle 1 to rear-left" as future behavior of the vehicle 1, on the basis of vehicle's internal and external information.

The illumination control unit 11 identifies an area around the vehicle 1 expected to be affected by the abnormal behavior of the vehicle 1 which is estimated by the vehicle behavior estimating unit 10, and controls the pattern illuminating units 4a to 4d to illuminate a projection pattern onto the ground in the identified area around the vehicle 1.

For example, the illumination control unit 11 selects a projection pattern on the basis of the future behavior "rollover of the vehicle 1 to rear-left", and further identifies an area on the rear left side of the vehicle 1 expected to be affected by the future behavior, and selects the pattern illuminating units 4b and 4d whose illumination regions correspond to the identified area.

The pattern illuminating unit 4b illuminates a projection pattern onto the ground on the left side of the vehicle 1, and the pattern illuminating unit 4d illuminates the projection pattern onto a ground behind the vehicle 1. The person 12 can intuitively recognize the risk of rollover of the vehicle 1 from the projection pattern illuminated onto the ground on the left side of the vehicle 1. In addition, the person 13 can, though he/she is facing in the direction in which the vehicle 1 is out of his/her sight, intuitively recognize the risk of rollover of the vehicle 1 from the projection pattern illuminated onto the ground behind the vehicle 1. By this, it becomes possible for the person 12 and the person 13 to evacuate an area around the vehicle 1.

Note that although FIG. 6 shows rollover of the vehicle 1 associated with changes in the elevation of the ground, no limitation is intended by this example. For example, in addition to the changes in the elevation of the ground, in various abnormal behavior, such as a slide-down or skid of the vehicle 1 and uncontrollable travel due to a slip of the vehicle 1 on flat ground which are caused by a reduction in the friction coefficient of the ground, too, by illuminating a projection pattern onto the ground around the vehicle 1 in the same manner as described above, the behavior of the vehicle can be grasped, without generating noise, by a person who does not pay attention to the vehicle.

In addition, when there is a tendency for future behavior of the vehicle 1 which is sequentially estimated by the vehicle behavior estimating unit 10 to get worse, the illumination control unit 11 may control the pattern illuminating units 4a to 4d to change the display mode of a projection pattern in accordance with the tendency.

For example, when it is determined, from future behavior of the vehicle 1 which is sequentially estimated by the vehicle behavior estimating unit 10, that the amount of increase in the inclination of the vehicle 1 at a set interval is greater than or equal to a threshold value, the illumination control unit 11 changes the flashing interval of a projection pattern. Further, when the amount of increase in the inclination of the vehicle 1 at a set interval is greater than or equal to a threshold value, the illumination control unit 11 may control the pattern illuminating units 4a to 4d to increase the intensity of light of a projection pattern step by step or change color to alert color step by step.

A person present around the vehicle 1 can intuitively recognize the risk of being affected by abnormal behavior of the vehicle 1, by such a projection pattern.

Furthermore, the illumination control unit 11 may divide an area around the vehicle 1 expected to be affected by abnormal behavior of the vehicle 1 into a plurality of areas in accordance with a distance from the vehicle 1, and control the pattern illuminating units 4a to 4d to illuminate the plurality of areas with different shapes of the projection pattern, respectively, such that the different shapes of the projection pattern form a gradual pattern.

For example, the illumination control unit 11 makes the pattern illuminating units 4a to 4d illuminate a projection pattern of an acute shaped graphic onto an area close to the vehicle 1, and continuously alters the shape of the projection pattern to a rounder graphic as it goes away from the vehicle 1. A person present around the vehicle 1 can intuitively recognize risk of being affected by abnormal behavior of the vehicle 1 also by such a projection pattern.

In the above, a case in which the projection pattern is a graphic pattern is shown. In addition, the projection pattern may be a character pattern or may be a combination of a character pattern and a graphic pattern.

Namely, the display mode of the projection pattern corresponds to at least one of the speed of flashing, color, brightness, chroma, intensity, shape, size, addition of character information, and addition of graphic information.

Figure 7:
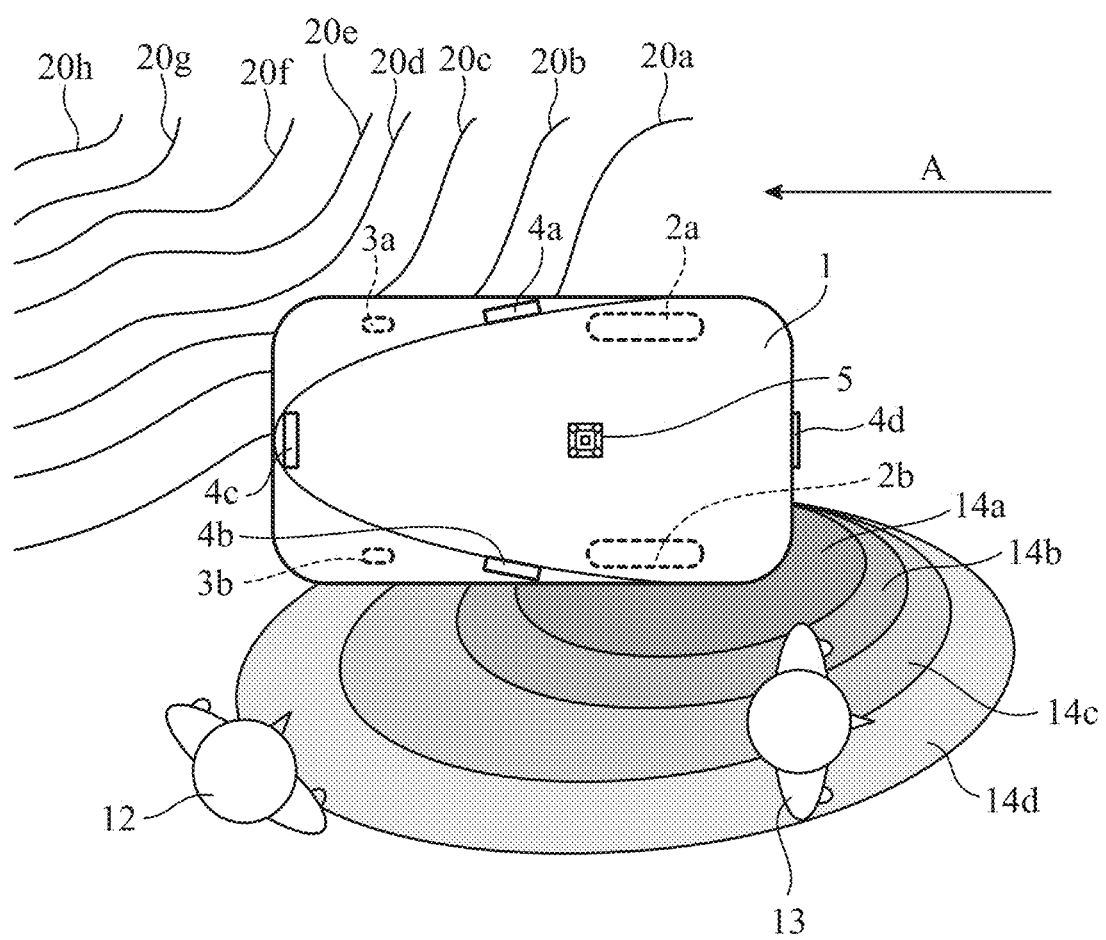
FIG. 7 is a diagram showing exemplary illumination of another projection pattern of the first embodiment.

FIG. 7 is a diagram showing an example of illumination of another projection pattern. In FIG. 7, there are the person 12 and the person 13 around the vehicle 1, and the person 12 faces in a direction in which he/she can view the vehicle 1, but the person 13 faces in a direction in which the vehicle 1 is out of his/her sight. The pattern illuminating units 4b and 4d illuminate projection patterns 14a to 14d onto the ground on the left side of the vehicle 1 and the ground behind the vehicle 1. The projection patterns 14a to 14d are illuminated onto a plurality of areas set on the basis of the distance from the vehicle 1.

For example, the projection pattern 14a with the highest brightness is illuminated onto an area which is closest to the vehicle 1 and expected to be affected most by abnormal behavior of the vehicle 1. In the farther area, the projection pattern 14b and the projection pattern 14c whose brightness decreases step by step as the area goes away from the vehicle 1 are illuminated, and the projection pattern 14d with the lowest brightness is illuminated onto an area which is farthest from the vehicle 1 and expected to be affected the least by the abnormal behavior of the vehicle 1.

A person present around the vehicle 1 can intuitively recognize whether he/she is present in an area that is likely to be affected by the abnormal behavior of the vehicle 1, by such projection patterns.

In the above, a case in which the brightness of a projection pattern is changed is shown. In addition, the display mode of a projection pattern to be changed is change of at least one of the speed of flashing, color, brightness, chroma, intensity, shape, size, addition of character information, and addition of graphic information.

In the above, a case in which the vehicle 1 is an autonomously moving vehicle without a person on board is shown. Further, the vehicle 1 may be a vehicle whose travel is controlled by remote operations.

Figure 8:
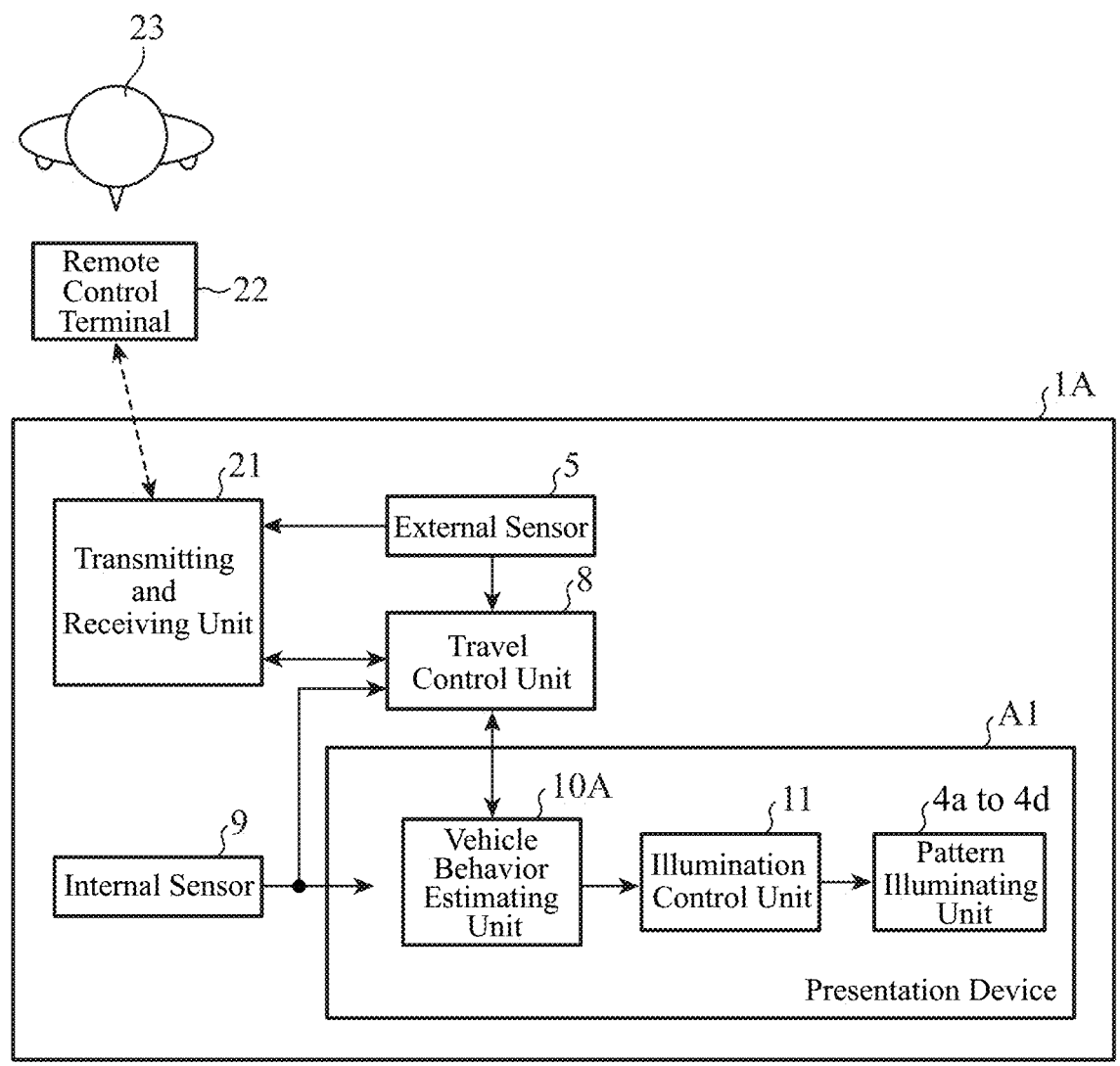
FIG. 8 is a block diagram showing another configuration of a vehicle control system including a presentation device according to the first embodiment.

FIG. 8 is a block diagram showing a configuration of a vehicle control system including a presentation device A1. In this configuration, the presentation device A1 is mounted on a vehicle 1A that is remotely operated by a remote control terminal 22. In FIG. 8, the same components as those of FIG. 3 are denoted by the same reference signs and description thereof is omitted.

The vehicle control system shown in FIG. 8 includes the external sensor 5, the travel control unit 8, the internal sensor 9, a transmitting and receiving unit 21, and the presentation device A1.

The transmitting and receiving unit 21 is a component that performs wireless communication or wired communication with the remote control terminal 22, and receives control information from the remote control terminal 22. The remote control terminal 22 transmits control information in accordance with an operation by an operator 23 to the transmitting and receiving unit 21.

The travel control unit 8 controls the rotating drive of the driving wheels 2a and 2b in accordance with the control information received by the transmitting and receiving unit 21, by which the vehicle 1A travels.

Vehicle's external information detected by the external sensor 5 is outputted to the travel control unit 8 and the transmitting and receiving unit 21. The transmitting and receiving unit 21 transmits the vehicle's external information inputted from the external sensor 5 to the remote control terminal 22. The operator 23 can perform remote control of the vehicle 1A with reference to the vehicle's external information received by the remote control terminal 22. For example, when an obstacle is detected in a proceeding direction of the vehicle 1A by the external sensor 5, the vehicle 1A can be remotely controlled so as to avoid the detected obstacle.

The presentation device A1 includes the pattern illuminating units 4a to 4d, a vehicle behavior estimating unit 10A, and the illumination control unit 11. The vehicle behavior estimating unit 10A is an estimating unit that estimates behavior of the vehicle 1A, and estimates behavior of the vehicle 1A on the basis of at least one of the control information for the vehicle 1 obtained from the travel control unit 8, the vehicle's external information detected by the external sensor 5, and vehicle's internal information detected by the internal sensor 9.

The illumination control unit 11 controls the pattern illuminating units 4a to 4d to illuminate a projection pattern in accordance with the behavior of the vehicle 1A estimated by the vehicle behavior estimating unit 10A.

Behavior estimation information of the vehicle 1A estimated by the vehicle behavior estimating unit 10A is outputted to the travel control unit 8, and the travel control unit 8 controls the transmitting and receiving unit 21 to transmit the behavior estimation information of the vehicle 1A to the remote control terminal 22. The operator 23 can perform remote control of the vehicle 1A with reference to the behavior estimation information of the vehicle 1A received by the remote control terminal 22.

In a conventional remote control vehicle, it is difficult for an operator to actually grasp the state of the ground on which the vehicle is traveling, but in the presentation device A1 according to the first embodiment, the operator can grasp future behavior such as inclination of the vehicle 1 in accordance with bumps and dips on the ground.

In addition, a person around the vehicle 1A can intuitively recognize the risk of being affected by abnormal behavior of the vehicle 1A, by a projection pattern illuminated onto the ground around him/her.

Each function of the vehicle behavior estimating unit 10A and the illumination control unit 11 of the presentation device A1 is implemented by a processing circuit. Namely, the presentation device A1 includes a processing circuit for performing these functions. As shown in FIGS. 4A and 4B, the processing circuit may be dedicated hardware or may be a processor that executes programs stored in a memory.

As described above, the presentation devices A and A1 according to the first embodiment include the vehicle behavior estimating units 10 and 10A estimating behavior of the vehicles 1 and 1A; the pattern illuminating units 4a to 4d illuminating a projection pattern onto the ground around the vehicles 1 and 1A; and the illumination control unit 11 controlling the pattern illuminating units 4a to 4d to illuminate a projection pattern in accordance with the behavior of the vehicles 1 and 1A estimated by the vehicle behavior estimating unit 10. By configuring the presentation devices A and A1 in this manner, a projection pattern in accordance with behavior of the vehicles 1 and 1A is illuminated onto the ground around the vehicles 1 and 1A, and thus, without generating noise, the behavior of the vehicles 1 and 1A can be grasped by a person who does not pay attention to the vehicles 1 and 1A.

In the presentation devices A and A1 according to the first embodiment, the vehicle behavior estimating units 10 and 10A estimate abnormal behavior of the vehicles 1 and 1A, on the basis of detected information obtained from the internal sensor 9 detecting the behavior of the vehicles 1 and 1A. Furthermore, the vehicle behavior estimating units 10 and 10A estimate abnormal behavior of the vehicles 1 and 1A, on the basis of detected information obtained from the external sensor 5 detecting conditions around the vehicles 1 and 1A. By thus using vehicle's internal and external information obtained from the internal sensor 9 and the external sensor 5, the vehicle behavior estimating units 10 and 10A can estimate abnormal behavior of the vehicles 1 and 1A in high accuracy.

In the presentation devices A and A1 according to the first embodiment, when there is a tendency for abnormal behavior of the vehicles 1 and 1A estimated by the vehicle behavior estimating units 10 and 10A to get worse, the illumination control unit 11 controls the pattern illuminating units 4a to 4d to change the display mode of a projection pattern in accordance with the tendency. The display mode of the projection pattern includes at least one of the speed of flashing, color, brightness, chroma, intensity, shape, size, addition of character information, and addition of graphic information.

By configuring the presentation devices A and A1 in this manner, a person around the vehicles 1 and 1A can intuitively recognize the risk of being affected by abnormal behavior of the vehicles 1 and 1A.

In the presentation devices A and A1 according to the first embodiment, the illumination control unit 11 identifies an area around the vehicles 1 and 1A expected to be affected by abnormal behavior of the vehicles 1 and 1A, and controls the pattern illuminating units 4a to 4d to illuminate a projection pattern onto ground in the identified area around the vehicles 1 and 1A, the abnormal behavior being estimated by the estimating unit.

By configuring the presentation devices A and A1 in this manner, a person around the vehicles 1 and 1A can intuitively recognize the risk of being affected by abnormal behavior of the vehicles 1 and 1A.

In the presentation devices A and A1 according to the first embodiment, the illumination control unit 11 further divides the area around the vehicles 1 and 1A expected to be affected by the abnormal behavior of the vehicles 1 and 1A into a plurality of areas in accordance with a distance from the vehicle 1, and controls the pattern illuminating units 4a to 4d to illuminate the plurality of areas with different modes of the projection pattern, respectively, such that the different modes of the projection pattern form a gradual pattern. By configuring the presentation devices A and A1 in this manner, a person around the vehicles 1 and 1A can intuitively recognize the risk of being affected by abnormal behavior of the vehicles 1 and 1A.

Second Embodiment

Figure 9:
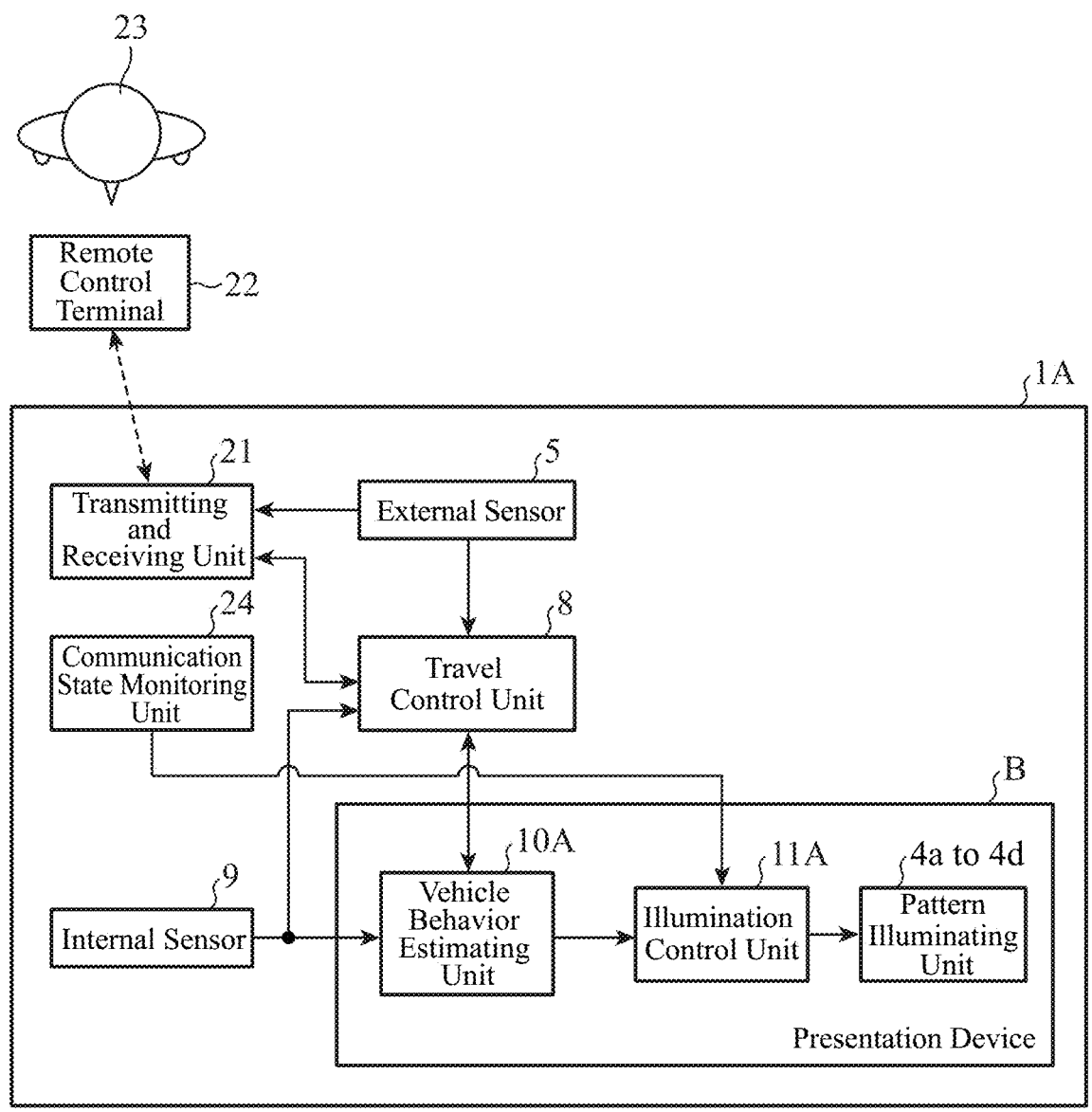
FIG. 9 is a block diagram showing a configuration of a vehicle control system including a presentation device according to a second embodiment of the invention.

FIG. 9 is a block diagram showing a configuration of a vehicle control system including a presentation device B according to a second embodiment of the invention. In FIG. 9, the same components as those of FIGS. 3 and 8 are denoted by the same reference signs and description thereof is omitted. The vehicle control system shown in FIG. 9 is mounted on the vehicle 1A that is remotely controlled using the remote control terminal 22, and includes the external sensor 5, the travel control unit 8, the internal sensor 9, the transmitting and receiving unit 21, a communication state monitoring unit 24, and the presentation device B.

The communication state monitoring unit 24 is a component that monitors a communication state between the transmitting and receiving unit 21 and the remote control terminal 22. For example, the communication state monitoring unit 24 monitors a communication state between the transmitting and receiving unit 21 and the remote control terminal 22 every certain period of time.

The presentation device B includes the pattern illuminating units 4a to 4d, the vehicle behavior estimating unit 10A, and an illumination control unit 11A. The illumination control unit 11A controls, as in the first embodiment, the pattern illuminating units 4a to 4d to illuminate a projection pattern in accordance with behavior estimated by the vehicle behavior estimating unit 10A. In addition, when the control of the vehicle 1A by the remote control terminal 22 becomes impossible, the illumination control unit 11A controls the pattern illuminating units 4a to 4d to illuminate a projection pattern.

Each function of the vehicle behavior estimating unit 10A and the illumination control unit 11A of the presentation device B is implemented by a processing circuit. Namely, the presentation device B includes a processing circuit for performing these functions. As shown in FIGS. 4A and 4B, the processing circuit may be dedicated hardware or may be a processor that executes programs stored in a memory.

Next, operation will be described.

Figure 10:
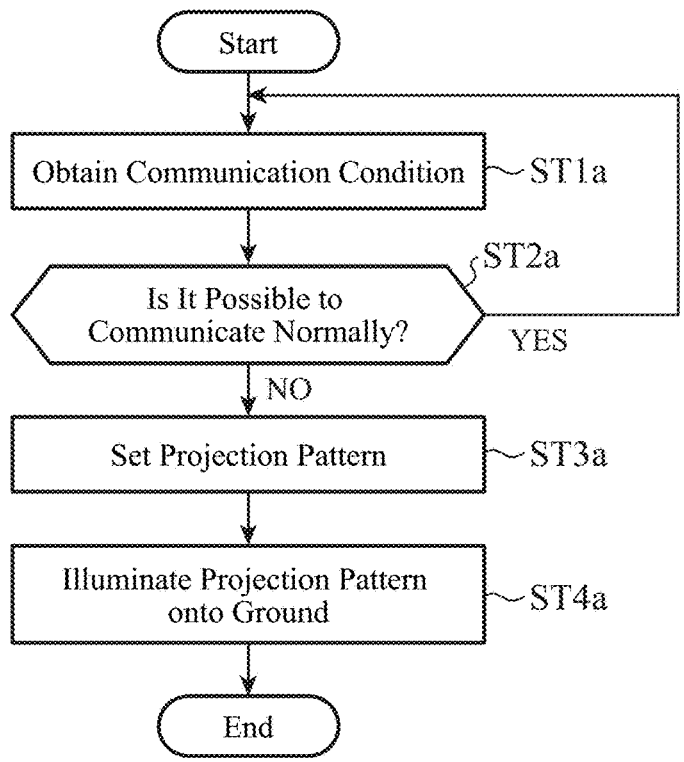
FIG. 10 is a flowchart showing an operation of the presentation device according to the second embodiment.

FIG. 10 is a flowchart showing an operation of the presentation device B, and shows a specific example of a process of illuminating a projection pattern. Note that prior to the operation shown in FIG. 10, travel of the vehicle 1A is controlled by the remote control terminal 22.

First, the illumination control unit 11A obtains a result of monitoring the communication state from the communication state monitoring unit 24 (step ST1a). For example, every time the communication state monitoring unit 24 monitors a communication state every certain period of time, the illumination control unit 11A obtains a result of the monitoring.

Then, the illumination control unit 11A determines whether normal communication can be performed between the transmitting and receiving unit 21 and the remote control terminal 22, on the basis of the result of monitoring a communication state obtained from the communication state monitoring unit 24 (step ST2a). If normal communication can be performed (step ST2a; YES), processing returns to the process at step ST1a, and monitoring of the communication state continues.

If it is determined that the communication state is abnormal, e.g., communication is interrupted (step ST2a; NO), the illumination control unit 11A determines that control of the vehicle 1A by the remote control terminal 22 has become impossible, and sets a projection pattern corresponding to the state that remote control is impossible, on the pattern illuminating units 4a to 4d (step ST3a).

The pattern illuminating units 4a to 4d illuminate the projection pattern set by the illumination control unit 11A onto the ground around the vehicle 1A (step ST4a).

Conventionally, even if control of a vehicle by a remote control terminal becomes impossible, a person around the vehicle cannot grasp the fact that the vehicle is uncontrollable, until the vehicle runaways.

On the other hand, in the presentation device B according to the second embodiment, a person around the vehicle 1A can grasp the fact that remote control of the vehicle 1A is impossible by a projection pattern, so that it is possible to prompt the person to evacuate an area around the vehicle 1A.

Next, a specific example of illumination of a projection pattern will be described.

Figure 11:
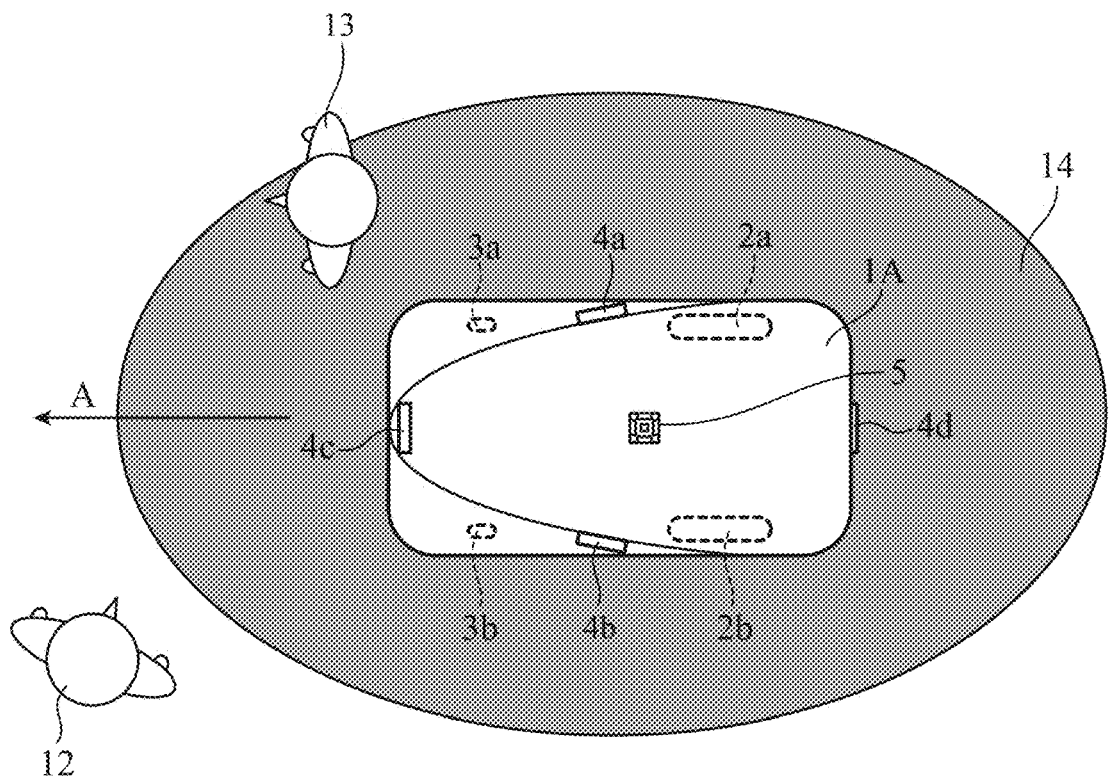
FIG. 11 is a diagram showing exemplary illumination of a projection pattern of the second embodiment.

FIG. 11 is a diagram showing an example of illumination of a projection pattern. In FIG. 11, there are the person 12 and the person 13 around the vehicle 1A, and the person 12 faces in a direction in which he/she can view the vehicle 1A, but the person 13 faces in a direction in which the vehicle 1A is out of his/her sight. When remote control by the remote control terminal 22 becomes impossible, the pattern illuminating units 4a to 4d illuminate a projection pattern 14 onto the ground around the vehicle 1A. Since the vehicle 1A is proceeding in the direction of the arrow A, the illumination control unit 11A may control the pattern illuminating unit 4c to highlight a projection pattern illuminated onto the ground ahead of the vehicle 1A.

The person 12 can intuitively recognize the fact that the vehicle 1A is uncontrollable, by the illumination of the projection pattern onto the ground ahead of the vehicle 1A. In addition, the person 13 can, though he/she faces in the direction in which the vehicle 1A itself is out of his/her sight, intuitively recognize the fact that the vehicle 1A is uncontrollable, by the illumination of the projection pattern onto the ground ahead of the vehicle 1A.

As described above, in the presentation device B according to the second embodiment, when control of the vehicle 1A by the remote control terminal 22 becomes impossible, the illumination control unit 11A makes the pattern illuminating units 4a to 4d illuminate a projection pattern. By configuring the presentation device B in this manner, the fact that remote control of the vehicle 1A is impossible can be grasped from the projection pattern.

Third Embodiment

Figure 12:
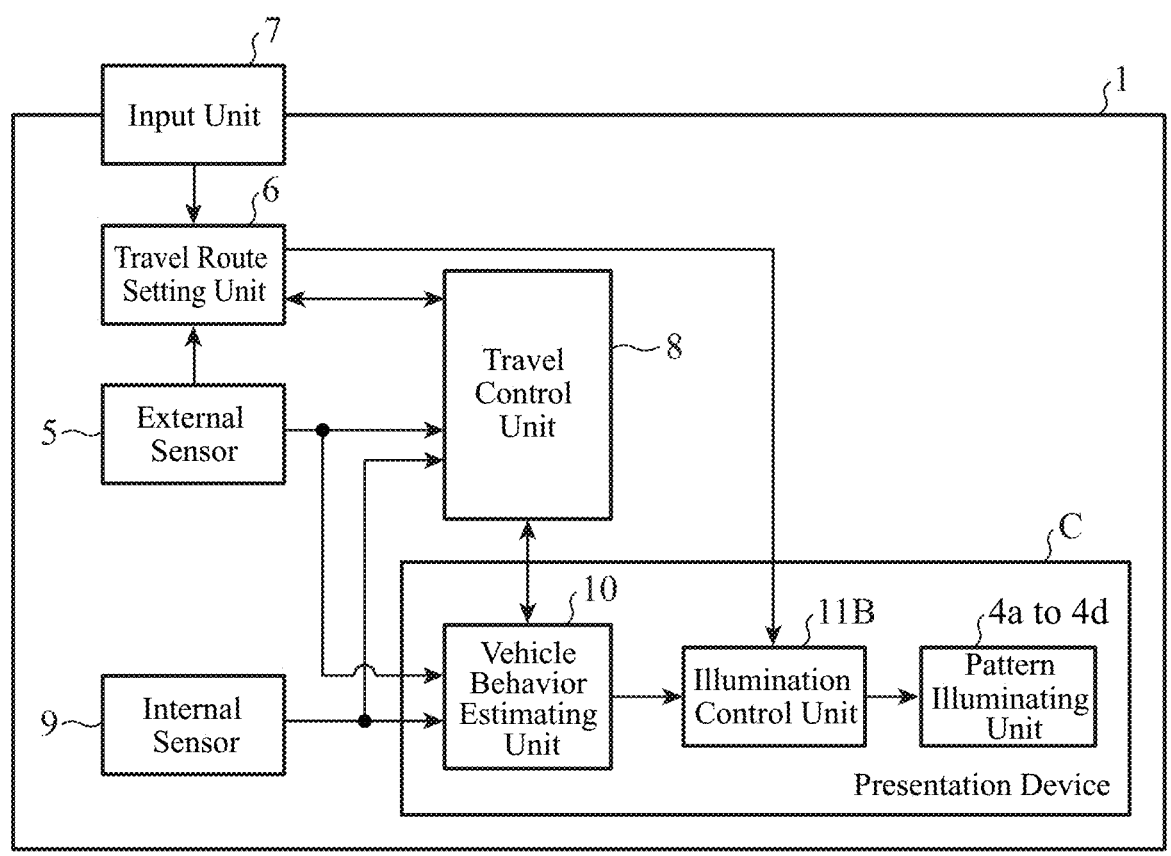
FIG. 12 is a block diagram showing a configuration of a vehicle control system including a presentation device according to a third embodiment of the invention.

FIG. 12 is a block diagram showing a configuration of a vehicle control system including a presentation device C according to a third embodiment of the invention. In FIG. 12, the same components as those of FIG. 3 are denoted by the same reference signs and description thereof is omitted. The vehicle control system shown in FIG. 12 is mounted on the vehicle 1, and includes the external sensor 5, the travel route setting unit 6, the input unit 7, the travel control unit 8, the internal sensor 9, and the presentation device C.

The presentation device C includes the pattern illuminating units 4a to 4d, the vehicle behavior estimating unit 10, and an illumination control unit 11B. The illumination control unit 11B controls, as in the first embodiment, the pattern illuminating units 4a to 4d to illuminate a projection pattern in accordance with behavior estimated by the vehicle behavior estimating unit 10. Furthermore, when the vehicle behavior estimating unit 10 estimates that the vehicle 1 goes into a deadlock state in which the vehicle 1 cannot move in any direction, the illumination control unit 11B makes the pattern illuminating units 4a to 4d illuminate a projection pattern in accordance with the result of the estimation.

Each function of the vehicle behavior estimating unit 10 and the illumination control unit 11B of the presentation device C is implemented by a processing circuit. Namely, the presentation device C includes a processing circuit for performing these functions. As shown in FIGS. 4A and 4B, the processing circuit may be dedicated hardware or may be a processor that executes programs stored in a memory.

Next, operation will be described.

Figure 13:
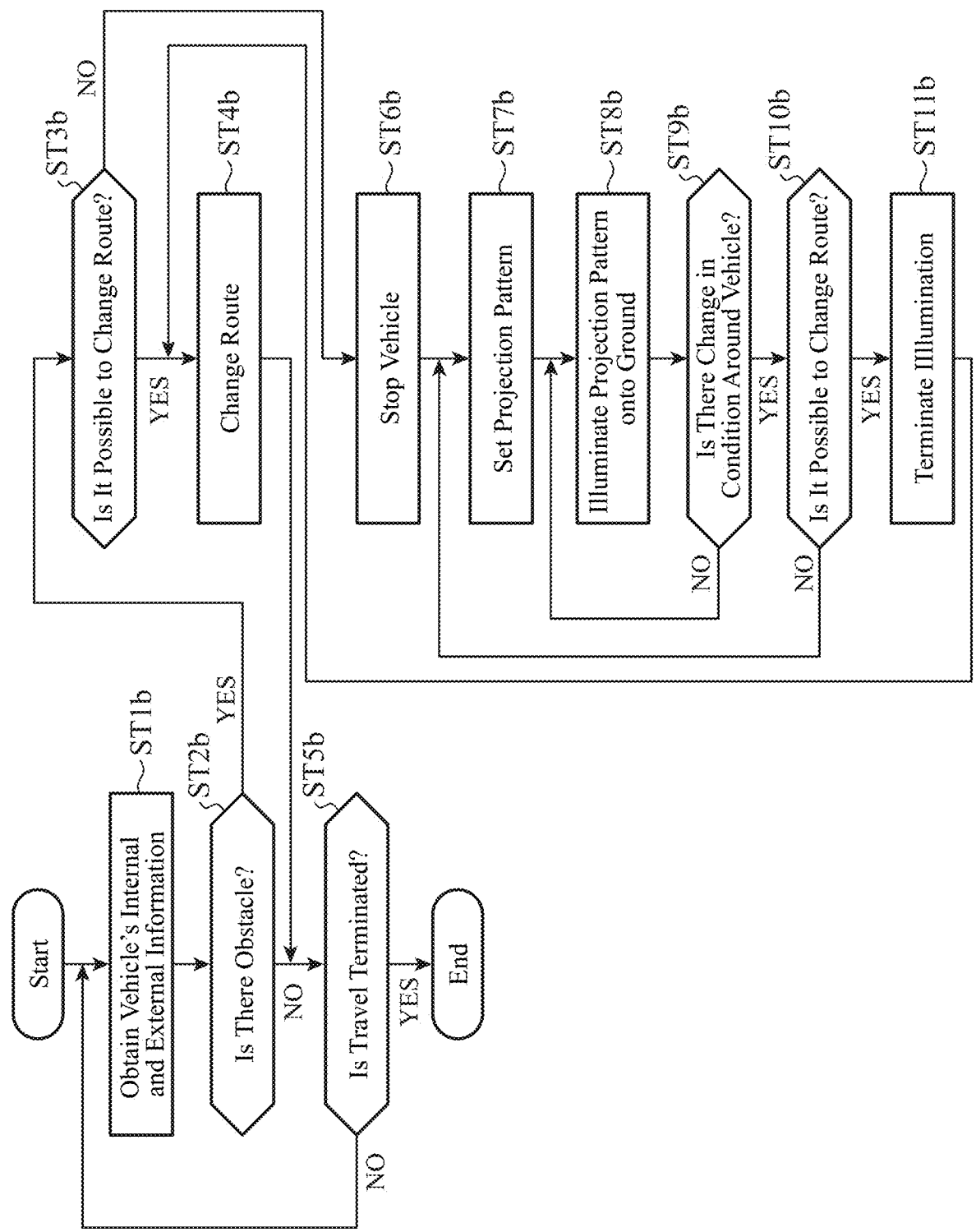
FIG. 13 is a flowchart showing an operation of the vehicle control system including the presentation device according to the third embodiment.

FIG. 13 is a flowchart showing the operation of the vehicle control system including the presentation device C. Note that prior to the operation shown in FIG. 13, the input unit 7 accepts information required to calculate a travel route, the travel route setting unit 6 calculates a travel route on the basis of the information accepted by the input unit 7, and the travel control unit 8 makes the vehicle 1 travel in accordance with the travel route.

First, the travel control unit 8 and the vehicle behavior estimating unit 10 obtain vehicle's internal and external information detected by the external sensor 5 and the internal sensor 9 (step ST1b).

The travel control unit 8 determines whether there is an obstacle around the vehicle 1, on the basis of the vehicle's external information detected by the external sensor 5 (step ST2b).

If the travel control unit 8 determines that there is an obstacle on the travel route of the vehicle 1 (step ST2b; YES), the travel control unit 8 instructs the travel route setting unit 6 to calculate a route to avoid the obstacle.

Namely, the travel control unit 8 checks whether the route can be changed to a route to avoid the obstacle (step ST3b).

If the travel route setting unit 6 was able to calculate a route to avoid the obstacle, i.e., if the route can be changed to a route to avoid the obstacle (step ST3b; YES), the travel control unit 8 changes the travel route of the vehicle 1 to the above-described route calculated by the travel route setting unit 6 (step ST4b).

If it is determined that there is no obstacle on the travel route of the vehicle 1 (step ST2b; NO) or if the process at step ST4b is completed, the vehicle behavior estimating unit 10 determines whether the travel of the vehicle 1 is to be terminated, on the basis of vehicle's internal and external information (step ST5b).

For example, when the vehicle behavior estimating unit 10 estimates that the vehicle 1 approaches a destination point and the travel control by the travel control unit 8 is terminated, the vehicle behavior estimating unit 10 determines that the travel of the vehicle 1 is to be terminated.

If it is determined by the vehicle behavior estimating unit 10 that the travel of the vehicle 1 is to be terminated (step ST5b; YES), the process of FIG. 13 ends.

If it is not determined by the vehicle behavior estimating unit 10 that the travel of the vehicle 1 is to be terminated (step ST5b; NO), a series of processes from step ST1b is repeated.

On the other hand, if the travel route setting unit 6 was not able to calculate a route to avoid the obstacle, i.e., the route cannot be changed to a route to avoid the obstacle (step ST3b; NO), the travel control unit 8 determines that the vehicle 1 is in a so-called deadlock state in which the vehicle 1 cannot move in any direction, and stops the vehicle 1 (step ST6b). The vehicle behavior estimating unit 10 estimates that the vehicle 1 is to be in a deadlock state, on the basis of control information for the vehicle 1 inputted from the travel control unit 8.

The illumination control unit 11B sets a projection pattern corresponding to the future behavior that the vehicle 1 is to be in a deadlock state, on the pattern illuminating units 4a to 4d (step ST7b).

The pattern illuminating units 4a to 4d illuminate the projection pattern set by the illumination control unit 11B onto the ground around the vehicle 1 (step ST8b). A person around the vehicle 1 can grasp that the vehicle 1 is in a deadlock state, by visually recognizing the projection pattern illuminated onto the ground.

The travel control unit 8 determines whether condition around the vehicle 1 is changed, on the basis of vehicle's external information (step ST9b). For example, when an obstacle is detected around the vehicle 1 by the external sensor 5, it is determined that the condition around the vehicle 1 is changed.

If it is determined that the condition around the vehicle 1 is not changed (step ST9b; NO), processing returns to step ST8b, and the illumination of the projection pattern continues.

If it is determined that the condition around the vehicle is changed (step ST9b; YES), the travel control unit 8 instructs the travel route setting unit 6 to calculate a route on which the vehicle 1 can move. Namely, the travel control unit 8 checks whether the route can be changed (step ST10b).

For example, it is checked whether a route on which the obstacle detected by the external sensor 5 can be avoided can be calculated.

If the travel route setting unit 6 was able to calculate a route, i.e., the route can be changed (step ST10b; YES), the illumination control unit 11B controls the pattern illuminating units 4a to 4d to terminate the illumination of the projection pattern (step ST11b). Thereafter, processing transitions to the process at step ST4b. On the other hand, if the travel route setting unit 6 was not able to calculate a route, i.e. the route cannot be changed (step ST10b; NO), processing returns to step ST7b, and the illumination of the projection pattern continues.

Next, a specific example of illumination of a projection pattern will be described.

Figure 14:
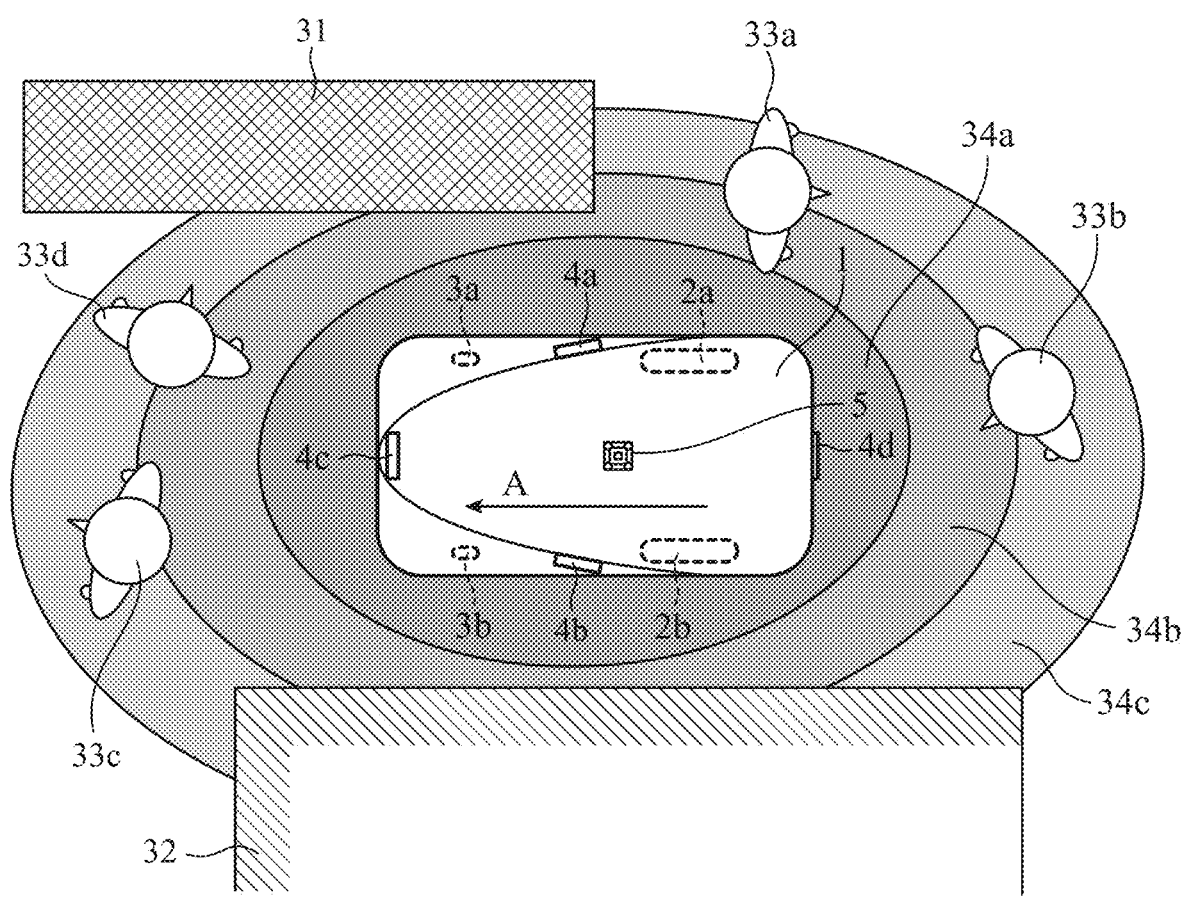
FIG. 14 is a diagram showing exemplary illumination of a projection pattern of the third embodiment.

FIG. 14 is a diagram showing an example of illumination of a projection pattern. In FIG. 14, there are obstacles 31 and 32, such as walls, around the vehicle 1, and furthermore, there are persons 33a to 33d. The person 33a and the person 33c each face in a direction in which the vehicle 1 is out of their sights. The pattern illuminating units 4a to 4d are illuminating projection patterns 34a to 34c onto the ground around the vehicle 1. The projection patterns 34a to 34c are illuminated onto a plurality of areas which respectively correspond to the distances from the vehicle 1.

For example, the projection pattern 34a with the highest brightness is illuminated onto an area closest to the vehicle 1. In the farther area, the projection pattern 34b whose brightness decreases step by step as the area goes away from the vehicle 1 is illuminated, and the projection pattern 34c with the lowest brightness is illuminated onto an area farthest from the vehicle 1. The persons 33a to 33d present around the vehicle 1 can intuitively recognize the deadlock state of the vehicle 1 by these projection patterns, and as a result, the persons 33a to 33d are prompted to evacuate an area around the vehicle 1. If the person 33c and the person 33d evacuate, then the vehicle 1 can move forward, and if the person 33a and the person 33b evacuate, then the vehicle 1 can move backward, by which the deadlock state is eliminated.

As described above, in the presentation device C according to the third embodiment, the illumination control unit 11B makes the pattern illuminating units 4a to 4d illuminate a projection pattern corresponding to a deadlock state of the vehicle 1 estimated by the vehicle behavior estimating unit 10. By configuring the presentation device C in this manner, a person around the vehicle 1 can intuitively recognize the deadlock state of the vehicle 1 by the projection pattern.

Note that the present invention is not limited to the above-described embodiments, and a free combination of the embodiments, modifications to any component of the embodiments, or omissions of any component in the embodiments are possible within the scope of the present invention.

INDUSTRIAL APPLICABILITY

The presentation device according to the present invention allow to grasp behavior of a vehicle, without generating noise, by a person who does not pay attention to the vehicle, and thus, is applicable to, for example, vehicle control systems.

REFERENCE SIGNS LIST 1 and 1A: Vehicle, 2a and 2b: Driving wheel, 3a and 3b: Driven wheel, 4a to 4d: Pattern illuminating unit, 5: External sensor, 6: Travel route setting unit, 7: Input unit, 8: Travel control unit, 9: Internal sensor, 10 and 10A: Vehicle behavior estimating unit, 11, 11A, and 11B: Illumination control unit, 12, 13, and 33a to 33d: Person, 14, 14a to 14d, and 34a to 34c: Projection pattern, 20a to 20h: Contour line, 21: Transmitting and receiving unit, 22: Remote control terminal, 23: Operator, 24: Communication state monitoring unit, 31 and 32: Obstacle, A, A1, B, and C: Presentation device, 100: Processing circuit, 101: Light emitting device, 102: Processor, and 103: Memory.

The invention claimed is:

1. A presentation device comprising processing circuitry, the processing circuitry being configured:
to estimate behavior of a vehicle;
to illuminate a projection pattern onto ground around the vehicle by an illuminator; and
to control the illuminator to illuminate the projection pattern in accordance with the behavior of the vehicle being estimated,
wherein when there is a tendency for abnormal behavior of the vehicle estimated by the to estimate to get worse, the processing circuitry is configured to control the illuminator to change a display mode of a projection pattern in accordance with the tendency, the projection pattern comprising a gradual pattern of incremental adjustments in intensity that varies on the ground based on distance from the vehicle,
wherein the projection pattern is disposed on a plurality of areas arranged adjacent to each other on the ground, and the gradual pattern of incremental adjustments corresponds to an incremental change in brightness of the projection pattern from a first area in the plurality of areas that is located closest to the vehicle to a second area in the plurality of areas that is located farthest away from the vehicle, and
wherein the projection pattern extends on the ground on a plurality of sides of the vehicle.

2. The presentation device according to claim 1, wherein in the to estimate, abnormal behavior of the vehicle is estimated, on a basis of detected information obtained from an internal sensor detecting the behavior of the vehicle.

3. The presentation device according to claim 1, wherein in the to estimate, abnormal behavior of the vehicle is estimated, on a basis of detected information obtained from an external sensor detecting conditions around the vehicle.

4. The presentation device according to claim 1, wherein in the to estimate the behavior of the vehicle, the abnormal behavior being estimated includes inclination of the vehicle, or tlre rollover, slide-down, skid, or slip of the vehicle associated with acceleration or deceleration of the vehicle.

5. A presentation device comprising processing circuitry, the processing circuitry being configured:
to estimate behavior of a vehicle;
to illuminate a projection pattern onto ground around the vehicle by an illuminator; and
to control the illuminator to illuminate the projection pattern in accordance with the behavior of the vehicle being estimated,
wherein in the to control, an area around the vehicle expected to be affected by abnormal behavior of the vehicle is identified, and the processing circuitry is configured to control the illuminator to illuminate a projection pattern onto ground in the area around the vehicle, the abnormal behavior being estimated by the to estimate,
wherein in the to control, the area around the vehicle expected to be affected by the abnormal behavior of the vehicle is divided into a plurality of areas in accordance with a distance from the vehicle, and the processing circuitry is configured to control the illuminator to illuminate the plurality of areas with different modes of the projection pattern, respectively, such that the different modes of the projection pattern form a gradual pattern of incremental adjustments in intensity,
wherein the plurality of areas is arranged adjacent to each other on the ground, and the gradual pattern of incremental adjustments corresponds to an incremental change in brightness of the projection pattern from a first area in the plurality of areas that is located closest to the vehicle to a second area in the plurality of areas that is located farthest away from the vehicle, and
wherein the projection pattern extends on the ground on a plurality of sides of the vehicle.

6. The presentation device according to claim 1, wherein the display mode of the projection pattern is at least one of a speed of flashing, color, brightness, chroma, intensity, shape, size, addition of character information, and addition of graphic information.

7. The presentation device according to claim 5, wherein in the to estimate the behavior of the vehicle, the abnormal behavior being estimated includes inclination of the vehicle, or the rollover, slide-down, skid, or slip of the vehicle associated with acceleration or deceleration of the vehicle.

* * * * *